United States Patent
Nagarkar et al.

(10) Patent No.: US 7,700,920 B2
(45) Date of Patent: Apr. 20, 2010

(54) ZNSE SCINTILLATORS

(75) Inventors: Vivek Nagarkar, Weston, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 51 days.

(21) Appl. No.: 11/894,484

(22) Filed: Aug. 20, 2007

(65) Prior Publication Data
US 2009/0050810 A1  Feb. 26, 2009

(51) Int. Cl.
*G01T 1/20* (2006.01)
(52) U.S. Cl. ................................. 250/361 R
(58) Field of Classification Search ............. 250/361 R, 250/370.11
See application file for complete search history.

(56) References Cited

U.S. PATENT DOCUMENTS

| | | | |
|---|---|---|---|
| 5,427,817 A | | 6/1995 | Goodman et al. |
| 5,444,247 A | * | 8/1995 | Trueet ................. 250/339.12 |
| 6,254,806 B1 | * | 7/2001 | Valdna et al. ......... 252/301.6 R |
| 6,989,541 B2 | | 1/2006 | Penn |
| 7,173,247 B2 | | 2/2007 | Shah |
| 7,304,309 B2 | * | 12/2007 | Suhami ................. 250/370.11 |
| 7,405,406 B1 | * | 7/2008 | Nagarkar et al. ............ 250/366 |
| 2003/0010923 A1 | * | 1/2003 | Zur ....................... 250/370.09 |

OTHER PUBLICATIONS

Ryzhikov et al, New Semiconductor Scintillators ZnSe(Te, O) and Integrated Radiation Detectors Based Thereon, IEEE Transactions on Nuclear Science, vol. 48, No. 3, Jun. 2001.*

Atroshchenko et al., "Doping methods and properties of the solid solutions on $A^{II} B^{VI}$ crystals," *Functional Materials* 12:610-615 (2005).

Diawara et al., "Scintillators for high efficiency and high spatial resolution in x-ray imaging applications," *Hard X-Ray and Gamma-Ray Detector Physics V, Proceedings of SPIE* 5198:119-125 (2003).

Durst et al., "Advances in X-Ray Conversion Technology for CCD Detectors," *Acta. Cryst.* A58 (Supplement): C237 (2002).

KAF-4320E, Device Performance Specification, Kodak, <http://www.kodak.com>, 34 pgs (Apr. 19, 2004).

Kang et al., "Synthesis and characterization of oxgen doped ZnTe for powder phosphor application," *J. Mater Res.* 20:2510-2515 (2005).

Kang et al., "Effects of annealing atmosphere on the luminescent efficiency of Znte:O phosphors," *J. Luminescence* 117:156-162 (2006).

Matsumura et al., "Optimum growth conditions of molecular beam epitaxial growth of ZnSe at a low temperature," *J. Crystal Growth* 150:755-759 (1995).

(Continued)

*Primary Examiner*—David P Porta
*Assistant Examiner*—Marcus H Taningco
(74) *Attorney, Agent, or Firm*—Townsend and Townsend and Crew LLP

(57) ABSTRACT

The present invention relates to a microcolumnar zinc selenide (ZnSe) scintillator and uses thereof, and methods of fabrication of microcolumnar scintillators using sublimation-based deposition techniques. In one embodiment, the present invention includes a scintillator including a microcolumnar scintillator material including zinc selenide (ZnSe) and a dopant. The microcolumnar scintillators of the present invention provide improved light channeling and resolution characteristics, thereby providing high spatial resolution, highly efficient scintillators.

33 Claims, 10 Drawing Sheets

OTHER PUBLICATIONS

Ryzhikov et al., "Luminescence of ZnSe(Te) crystals melt-grown from the charge enriched in Selenium," *International Conference on Optional Diagnosis of Materials and Devices for Opto-, Micro-, and Quantum Electroncis, Proceedings of SPIE* 3359:302-305 (1997).

Ryzhikov et al., "Luminescence dynamics in ZnSeTe scintillators," *J. Luminescence* 101:45-53 (2003).

Ryzhikov et al., "On luminescence kinetics of scintillators used in X-ray introscopy systems," *Functional Materials* 11:61-66 (2004).

Scintillation Crystals and its General Characteristics, <http://www.mt-berlin.com>, 2 pgs (retrieved on Nov. 20, 2007).

Stanton and Phillips, "Performance of detectors for x-ray crystallography," *SPIE* 2009:128-132 (1993).

* cited by examiner

ZNSE SCINTILLATORS

BACKGROUND OF THE INVENTION

The present invention relates to a scintillator. More specifically, the present invention relates to a microcolumnar zinc selenide scintillator and use thereof, and methods of fabrication of microcolumnar scintillators using sublimation-based deposition techniques.

Scintillation spectrometers are widely used in detection and spectroscopy of energetic photons (e.g., X-rays and γ-rays). Such detectors are commonly used, for example, in nuclear and particle physics research, medical imaging, diffraction, non destructive testing, nuclear treaty verification and safeguards, nuclear non-proliferation monitoring, and geological exploration.

Important requirements for the scintillation materials used in these applications include high light output, transparency to the light it produces, high stopping efficiency, fast response, good proportionality, low cost and availability in large volume. These requirements are often not met by many of the commercially available scintillators. While general classes of chemical compositions may be identified as potentially having some attractive scintillation characteristic(s), specific compositions/formulations and structures having both scintillation characteristics and physical properties necessary for actual use in scintillation spectrometers and various practical applications, as well as capability of imaging at a high resolution, have proven difficult to predict or produce. Specific scintillation properties are not necessarily predictable from chemical composition alone, and preparing effective scintillators from even candidate materials often proves difficult. For example, while the composition of sodium chloride had been known for many years, the invention by Hofstadter of a high light-yield and conversion efficiency scintillator from sodium iodide doped with thallium launched the era of modern radiation spectrometry. More than half a century later, thallium doped sodium iodide, in fact, still remains one of the most widely used scintillator materials. Since the invention of NaI(Tl) scintillators in the 1940's, for half a century radiation detection applications have depended to a significant extent on this material. The fields of nuclear medicine, radiation monitoring and spectroscopy have grown up supported by NaI(Tl). Although far from ideal, NaI(Tl) was relatively easy to produce for a reasonable cost and in large volume. With the advent of X-ray CT in the 1970's, a major commercial field emerged as did a need for different scintillators, as NaI(Tl) was not able to meet the requirements of CT imaging. Later, the commercialization of PET imaging provided the impetus for the development of yet another class of detector materials with properties suitable for PET. As the methodology of scintillator development evolved, new materials have been added, and yet, specific applications, particularly those requiring high resolution imaging, are still hampered by the lack of scintillators suitable for particular applications.

As a result, there is continued interest in the search for new scintillator formulations and physical structures with both the enhanced performance and the physical characteristics needed for use in various applications. Today, the development of new scintillators continues to be as much an art as a science, since the composition of a given material does not necessarily determine its performance and structural properties as a scintillator, which are strongly influenced by the history (e.g., fabrication process) of the material as it is formed. While it is may be possible to reject a potential scintillator for a specific application based solely on composition, it is not possible to predict whether a material with promising composition will produce a scintillator with the desired properties.

One promising group of scintillator compositions includes those made of zinc selenide. Solid crystalline forms of doped ZnSe have been produced (e.g., doped with Hg, Cd, Te, or Zn). For example, bulk ZnSe crystals have been synthesized by melt-based techniques and using crystal growth techniques such as the traveling heater method (THM), though the high pressure Bridgman technique is known to successfully produced scintillation grade material. The latter method is complex, as it requires a specialized carbon fiber-lined growth furnace, high temperature heaters to reach ~1600 C (needed for congruent melting of the material), and a well-balanced temperature gradient to foster nucleation and defect-free crystal growth. Furthermore, the process must be conducted in inert gas under high pressures of several atmospheres to ensure crystalline growth. Finally, an important step after crystal growth is annealing the crystals in a Zn atmosphere at very high temperatures to diffuse Zn in the bulk of the crystal, before the material can provide scintillation. The tremendous complexity of the current methods results in yield problems and a high cost for the scintillator.

Crystalline ZnSe thin films have also been fabricated by epitaxial growth techniques. However, very little or no work has been reported on the synthesis of efficient luminescent ZnSe (i.e., with dopants like Te) for X-ray/γ-ray detection. Additionally, this technique is limited to producing thin films, for example, measuring 1 μm or less in thickness, which can be inadequate for detecting X-rays due to inefficient absorption. Furthermore, this type of process is expensive and does not permit formation of a scintillator structure capable of both high detection efficiency and high-resolution imaging.

Besides crystalline form, ZnSe:Te can be synthesized in powder form, but powdered screens are limited in use due to a substantial tradeoff between detection efficiency, which increases with increasing scintillator thickness, and spatial resolution, which decreases with increasing scintillator thickness, inherent in the light diffusion process. Powdered screens have substantially decreased material density compared to non-powdered structures, thereby requiring much thicker screens needed to provide adequate photon (e.g., X-ray/γ-ray) absorption. Unfortunately, the much thicker powdered screens not only result in light loss due to internal scattering, but also result in poor spatial resolution. ZnSe material used in IR windows is manufactured by chemical vapor deposition (CVD), however, it does not include any activator doping and consequently is a non-scintillator.

Thus, a need exists for improved scintillator compositions and structures, including improved ZnSe scintillators, suitable for use in various radiation detection applications, including medical imaging applications, and capable of high resolution imaging.

BRIEF SUMMARY OF THE INVENTION

The present invention provides a microcolumnar zinc selenide scintillator and related devices and methods, as well as unique methods of fabricating microcolumnar scintillators from source materials that sublimate rather than melt upon heating. The scintillators of the invention are useful in a variety of applications including, for example, spectroscopy detection of energetic photons (X-rays and gamma-rays) and imaging applications (e.g., X-ray imaging, PET, etc.).

Thus, in one embodiment, the present invention includes a scintillator including a microcolumnar scintillator material including zinc selenide (ZnSe) and a dopant. Various dopants can be included in the microcolumnar scintillator of the present invention including, for example, tellurium (Te), oxygen (O), and copper (Cu). The improved light channeling and resolution characteristics of the disclosed microcolumnar scintillators allow for use of thicker scintillators, providing additional advantages of increased absorption efficiency with thicker scintillator with minimized loss of resolution. Thus, the microcolumnar scintillators of the present invention provide high spatial resolution scintillators as well as efficient scintillators, or scintillators having a high absorption efficiency. Additionally, the disclosed microcolumnar scintillators will typically have a high light output and preserve the other desirable properties of ZnSe as enumerated below.

In another embodiment, the present invention provides physical vapor deposition (PVD) methods of fabricating microcolumnar scintillators from source materials that sublimate in vacuum rather than melt upon heating. Such methods include fabricating a microcolumnar scintillator including co-sublimating a first material comprising ZnSe and a second material comprising a Zn-dopant salt so as to form a microcolumnar scintillator material layer deposited on a substrate, and annealing the microcolumnar scintillator in a zinc-containing atmosphere.

In yet another embodiment, the present invention includes a method of fabricating a microcolumnar scintillator, the method including providing a first boat having a first source material and a second boat having a second source material. The method further includes forming a microcolumnar scintillator deposited on a substrate, the forming including applying independently controlled temperature gradients to each of the first material and the second material so as to maintain substantially constant rates of material sublimation and deposition on the substrate, and annealing the microcolumnar scintillator deposited on the substrate.

In another embodiment, the present invention includes a radiation detection device. The radiation detection device includes a scintillator comprising a doped zinc selenide microcolumnar scintillator material formed on a substrate, and a photodetector assembly optically coupled to the scintillator.

In another embodiment, the present invention provides a method of performing radiation detection. The method includes providing a detector device comprising a scintillator comprising a doped zinc selenide microcolumnar scintillator material formed on a substrate, and a photodetector assembly optically coupled to the scintillator, and positioning a radiating source within a field of view of the scintillator so as to detect emissions from the radiation source.

Advantages of the microcolumnar scintillators of the invention and the sublimation deposition growth (e.g., PVD) technique for fabricating the ZnSe scintillator as described herein include the following: The material can be grown in a microcolumnar form needed for numerous high spatial resolution imaging applications. The fabrication techniques of the present invention allow preservation of the stoichiometry of the deposited film, even though the source material can include compounds having relatively large differences in vapor pressures and sticking coefficients. The sublimation deposition technique allows fabrication of large area (e.g., 50×50 $cm^2$ or larger) screens of the required thickness in a cost effective manner. Films may be fabricated on a variety of substrates, including rigid or flexible, opaque or transparent substrates of any shape, thereby making them adaptable for incorporation in a variety of detector configurations.

For a fuller understanding of the nature and advantages of the present invention, reference should be had to the ensuing detailed description taken in conjunction with the accompanying drawings. The drawings represent embodiments of the present invention by way of illustration. The invention is capable of modification in various respects without departing from the invention. Accordingly, the drawings/figures and description of these embodiments are illustrative in nature, and not restrictive.

BRIEF DESCRIPTION OF THE DRAWINGS

FIG. 5A is a side view showing columnar structure with columnar diameters of about 200 nm. FIG. 5B is a top view of the same scintillator showing segregation of bunches of fine columns that are important in minimizing long range spread of scintillation light and in improving spatial resolution.

DETAILED DESCRIPTION OF THE INVENTION

Figure 1A:
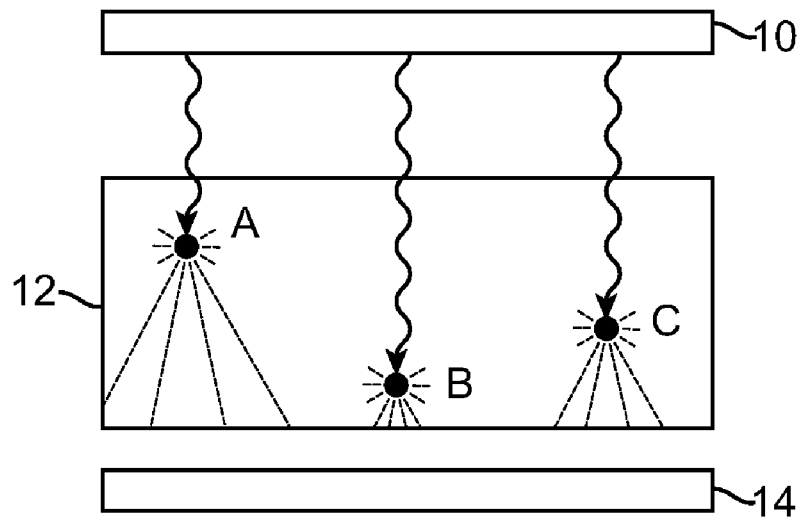
FIGS. 1A through 1B illustrate interaction with energetic photons incident on a solid crystalline scintillator (FIG. 1A) and microcolumnar scintillator (FIG. 1B).

The present invention provides a microcolumnar zinc selenide scintillator, properties of which are disclosed herein, as well as unique methods of fabricating microcolumnar scintillators from source materials that sublimate rather than melt upon heating. The scintillators of the invention are particularly useful, for example, for spectroscopy detection of energetic photons (X-rays and gamma-rays). Notable characteristics for the scintillation compositions of the invention include surprisingly robust light output, high x-ray stopping efficiency (attenuation), fast response, good proportionality, and minimal afterglow. Furthermore, the microcolumnar scintillator compositions are suitable for use in high resolution imaging and can be efficiently and economically produced. Thus, detectors including the microcolumnar scintillator composition of the invention are useful in a wide variety of applications, including without limitation nuclear and high energy physics research, medical imaging, diffraction, non-destructive testing, and nuclear treaty verification and safeguards.

Microcolumnar structure in scintillators of the present invention are advantageous, for example, in providing improved spatial resolution that permits use of thicker scintillators. Also, this technique allows scintillator manufacturing in very large areas, e.g., in excess of 50×50 cm$^2$, in a cost effective manner. Microcolumns act as a light guide by channeling light down the column and minimizing lateral light spread. The improved light channeling and increased spatial resolution allows for use of thicker scintillators, providing additional advantages of increased absorption efficiency with thicker scintillator with minimized loss of resolution. Thus, the microcolumnar structure of scintillators of the present invention allows for reduction of the traditional tradeoff between spatial resolution and absorption efficiency. See, e.g., FIGS. 1A-1B.

Zinc selenide scintillators (e.g., ZnSe:Te) of the present invention include red-emitting (e.g., about 610 nm) scintillators with high X-ray conversion efficiency, and may be used for a wide range of diffraction applications. ZnSe also has higher light output than commonly used scintillators, such as CsI:Tl, and is a good host material for applications such as X-ray imaging, e.g., because of its relatively small band gap and, subsequently, the small average energy required to create an electron-hole pair. Additionally, the relatively high density and X-ray absorption efficiency of ZnSe is beneficial for achieving higher X-ray luminescence. Furthermore, with a non-hygroscopic nature, ZnSe scintillators require minimum protection during normal use.

Specific advantages of ZnSe scintillators for applications such as time resolved diffraction and macromolecular crystallographic applications include the following: Very bright emission, e.g., up to about 170,000 photons/MeV, which can allow detection of single low-energy X-rays with high SNR and substantially improved detector dynamic range. High density (e.g., 5.4 g/cm$^3$) and a high effective atomic number can provide >98% efficiency for X-ray energies typically used in synchrotron applications using a relatively thin 16-54 mg/cm$^2$ (30-100 μm thick) screen needed to achieve high spatial resolution. Light emission in the range of about 550 nm to about 900 nm, with emission peaking at about 650 nm to about 750 nm depending on dopant concentration, provides an excellent match to the quantum efficiency of CCD sensors. For example, transparent gate, front illuminated CCDs such as the KAF-4320E from Kodak offer over 70% QE for 610 to 640 nm emissions, whereas certain back-thinned CCDs can achieve >95% QE for the same wavelength range. The fast decay time (e.g., about ~3 μs) and absence of afterglow (e.g., a reduction of 4 orders of magnitude of intensity within 10 μs after excitation) permits high speed time-resolved imaging to be performed without the problem of ghosting due to persistence. The non-hygroscopic nature of ZnSe scintillators makes it easier to handle during fabrication, and prevents scintillator degradation even after prolonged periods of time. ZnSe:Te, for example, is non-toxic, substantially reducing the precautions necessary in production, and it conserves its scintillation properties even after extremely high radiation doses in excess of 10$^8$ rads, making it an ideal material for radiation detection in general, and for synchrotron applications in particular.

The microcolumnar scintillator composition of the present invention typically includes a "dopant". These dopants can effect certain properties, such as physical properties (e.g., brittleness, etc.) as well as scintillation properties (e.g., luminescence, etc.), of the microcolumnar scintillator composition. For microcolumnar ZnSe scintillators of the invention, the dopant can include, for example, tellurium (Te), oxygen (O), copper (Cu), and the like, or mixtures of dopants. Tellurium is a particularly good dopant for use in microcolumnar ZnSe scintillator compositions of the invention because, for example, it imparts high luminescence efficiency, good timing resolution, and short decay time, as well as suitable physical properties (e.g., limited brittleness, etc.) to the scintillator composition of the present invention. The dopant can be supplied in various forms, e.g., as a ZnTe salt. Other dopants (e.g., ZnO, Cu2O, and CuSe) can be used in forming the microcolumnar ZnSe scintillator compositions of the invention.

The amount of dopant present will depend on various factors, such the application for which the scintillator composition is being used; the desired scintillation properties (e.g., emission properties, timing resolution, etc.); and the type of detection device into which the scintillator is being incorporated. For example, the dopant is typically employed at a level in the range of about 0.1% to about 20%, by molar weight. In many embodiments, the amount of dopant is in the range of about 0.1% to less than about 100%, or about 0.1% to about 5.0%, or about 5.0% to about 20%, by molar weight.

Thus, in one embodiment the present invention provides a microcolumnar scintillator including ZnSe and a dopant, the scintillator providing excellent radiation detection and imaging characteristics, including high spatial resolution and detection efficiency. As set forth above, while ZnSe has previously been grown in crystalline form, the crystals are difficult and expensive to grow. Powdered forms and thin films have disadvantages that negate much of the general benefits provided by ZnSe's properties. Furthermore, high detection efficiency requires a thicker material for many applications, but spatial resolution typically decreases as material thickness increases. For example, the spatial resolution of solid scintillator configurations will depend on the interaction depth of the incident photon (e.g., x-ray), with greater interaction depth yielding better resolution, as illustrated in FIG. 1A. FIG. 1A illustrates a radiation source 10 with incident photons interacting with solid scintillator 12 at various depths A, B, and C, and photodetector 14. Because of attenuation more photons will interact on the entrance side of the scintillator than on the distal side. Since typically the photodetector is placed distally with respect to an emission source or on a side of the scintillator opposite the scintillator side facing an emission source, more photons interact farther away from the detector than close to it. In this manner, light produced isotropically by the interaction has a longer distance over which to spread, broadening its footprint and thus reducing spatial resolution, which is primarily is a geometric effect. In addition, light emitted in the direction opposite the detector can scatter off the entrance surface and reach the detector with an even larger footprint (e.g., poorer resolution), and light emitted towards the detector scatters where it encounters crystal imperfections (FIG. 1). Thus, there is a typical tradeoff between spatial resolution and detection efficiency, with resolution decreasing and detection efficiency increasing with increasing scintillator thickness.

Figure 1B:
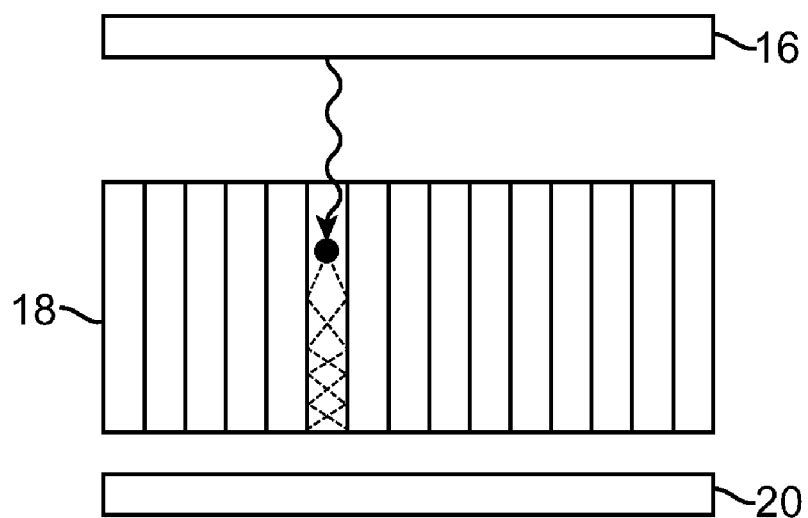

Referring to FIG. 1B, improved channeling of light in a microcolumnar scintillator of the present invention is illustrated. Photons emitted from radiation source 16 interact with the microcolumnar scintillator 18. Light produced from the incident photon is channeled down the microcolumn, minimizing light spreading laterally, e.g., and into adjacent microcolumns.

Figure 2A:
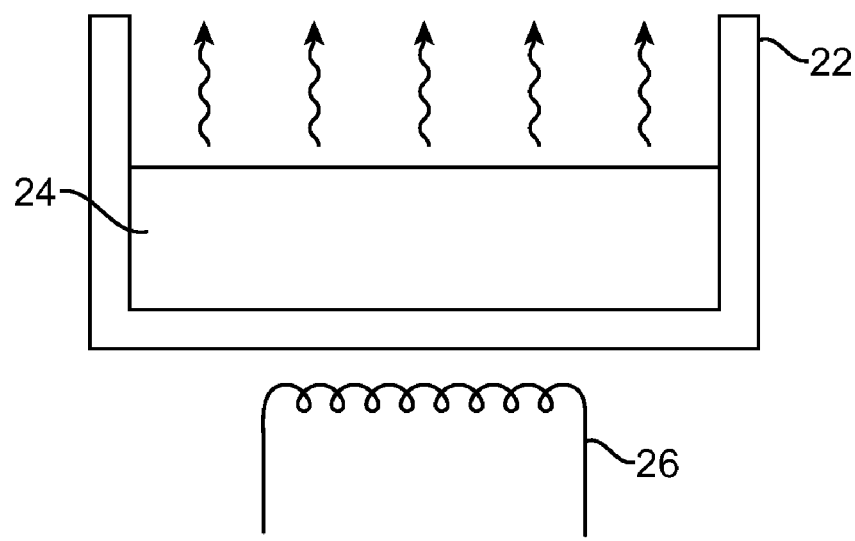
FIG. 2A shows vaporization of a source material according to a melt-based technique.

The present invention further provides unique methods of fabricating microcolumnar scintillators from source materials, such as ZnSe, that sublimate rather than melt upon heating. Previously known techniques for producing microcolumnar scintillators for materials such as CsI or LaBr scintillators are not suitable for use in producing microcolumnar scintillators from materials that sublimate, such as ZnSe. For example, previous techniques for producing microcolumnar scintillator layers typically include melting a source material and depositing it on a substrate in microcolumnar form via vapor deposition (see, e.g., U.S. Pat. No. 5,427,817). FIG. 2A illustrates a straight-sided boat 22 containing a source material 24 for producing a scintillator according to melt-based technique. Heat from source 26 is applied to the source material 24, which melts and then vaporizes. In the growth microcolumns from scintillator source materials that melt (e.g., CsI, LaBr), the source material for the scintillator is typically placed in a boat (e.g., a straight-sided container similar to a cup), melted, and held at constant temperature to obtain uniform growth of the columns. The material evaporated form the surface of the melt makes for a uniform source, and since the surface area does not change with volume, neither does the evaporation rate. Thus, evaporation rates remain constant as melted source material present in the boat decreases due to vaporization. This is illustrated in FIG. 2A.

While these melt-based techniques are effective for certain scintillator compositions (e.g., CsI, LaBr), they are unsuitable for others. For example, melt-based deposition methodology and associated equipment cannot effectively be used for scintillator materials (e.g., source materials) such as ZnSe, that, instead of melting, directly sublimate from a solid phase to a vapor phase.

Figure 2B:
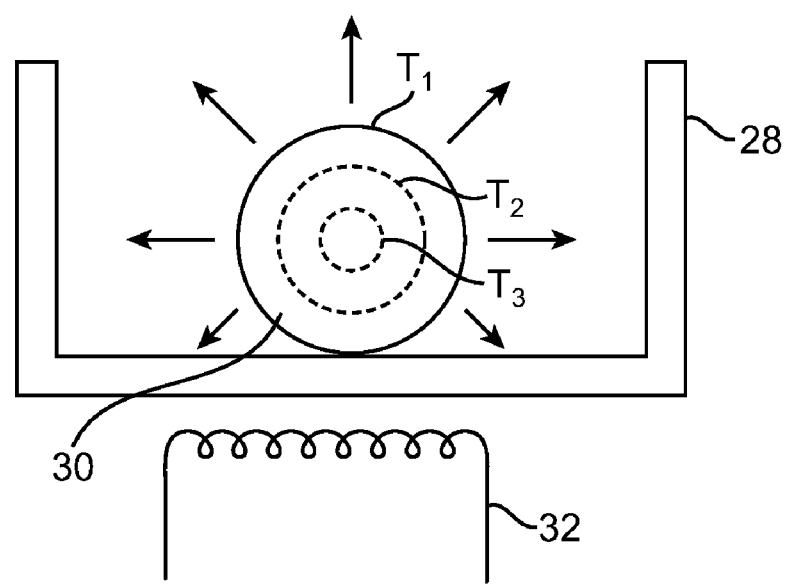
FIG. 2B illustrates a bolus of source material placed in an open top boat and sublimation of the source material with the application of heat.

For example, as a solid bolus of material sublimates, vaporization rates due to sublimation at constant temperature are non-uniform (e.g., FIG. 2B). FIG. 2B shows a straight-sided boat 28 with a source material 30, and heat source 32. As the solid material loses volume, the surface area decreases (dashed lines), and the smaller surface area results lower rates of material vaporizing and being deposited on a surface or substrate. In addition to non-uniform rate of vaporization at constant temperature, the sublimation is not spatially uniform. Because highly directional deposition is needed, straight-sided boats, as illustrated in FIGS. 2A-2B, are less effective for fabrication of microcolumnar scintillators from sublimating source material than for melt-based techniques.

Figure 3A:
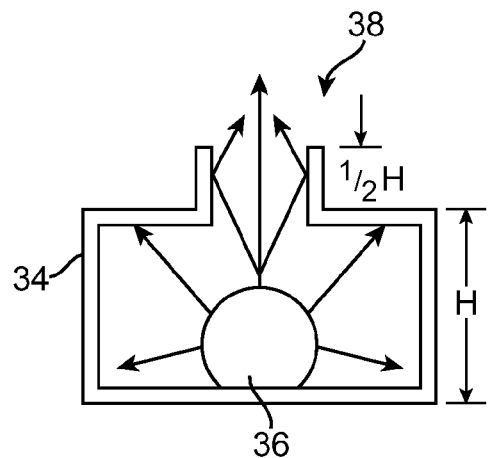
FIG. 3A illustrates a source boat and sublimation of a source material according to an embodiment of the present invention.
Figure 3B:
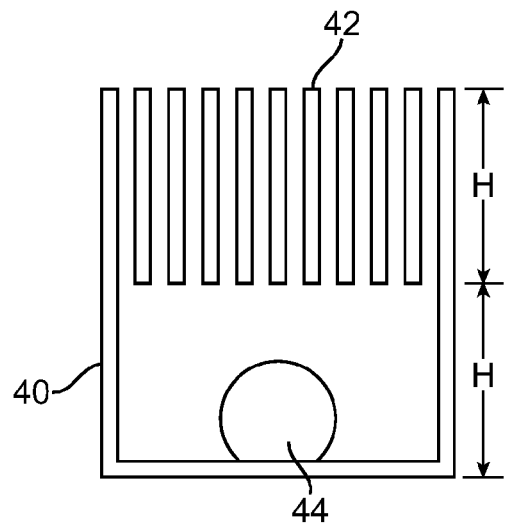
FIG. 3B illustrates a source boat for sublimation of a source material according to an embodiment of the present invention.

In one embodiment of the present invention, microcolumnar scintillator fabrication with sublimating source material can include use of a source boat having a means to filter or select certain vaporized material being emitted from the source boat, such that vapors traveling in particularly selected directions leave the source boat and can be deposited for scintillator formation. A source boat can include, for example, a collimator structure as illustrated in FIGS. 3A and 3B. Referring to FIG. 3A, source boat 34 includes a source material 36 and a collimator 38 for selectively allowing escape of vaporized material emitted from the source material 36. A high degree of directionality can be obtained by varying the width to length ratio of the collimator. The boat-to-substrate position and/or distance can affect collimator dimensions selected. In some instances, more than one boat will be used for sublimation and deposition of multiple source materials. For example, in an embodiment where a microcolumnar ZnSe:Te scintillator is being fabricated, two boats can be used, one for ZnSe, which sublimates in the 830-1000 degrees C. range, and another for ZnTe, which sublimates in the 600-700 degrees C. range.

Figure 3C:
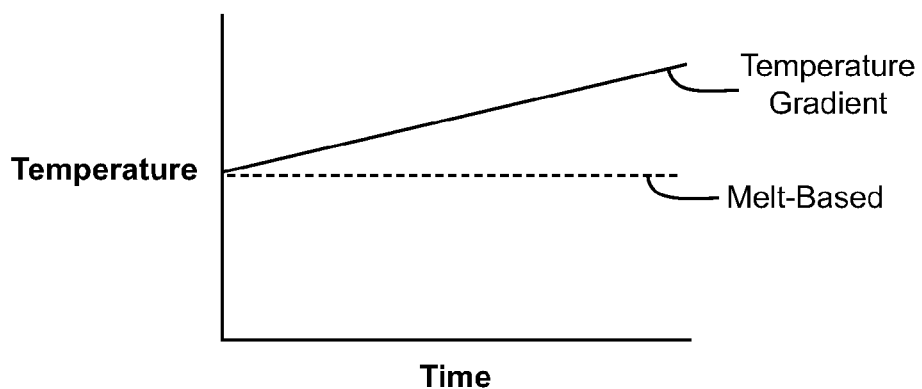
FIG. 3C shows a temperature versus time graph for a melt-based technique and application of a temperature gradient according to an embodiment of the present invention.

In one embodiment of the present invention, microcolumnar scintillator fabrication with sublimating source material can include applying a controlled temperature gradient to a material so as to form a microcolumnar scintillator material layer deposited on a substrate. For example, to solve the non-uniform rate of sublimation inherent in the use of a sublimating solid material, as described above, a controlled temperature during deposition is applied to a source material rather than keeping an applied temperature constant as in melt-based techniques. The controlled temperature gradient is applied so that a gradually increasing applied temperature augments the sublimation rate in direct proportion to the loss of surface area of the sublimating source material (see, e.g., FIG. 3C). Where multiple source materials are used, different source materials can be provided in separate boats, with each an independently controlled, and in some cases, different temperature regime selected and applied.

Figure 4:
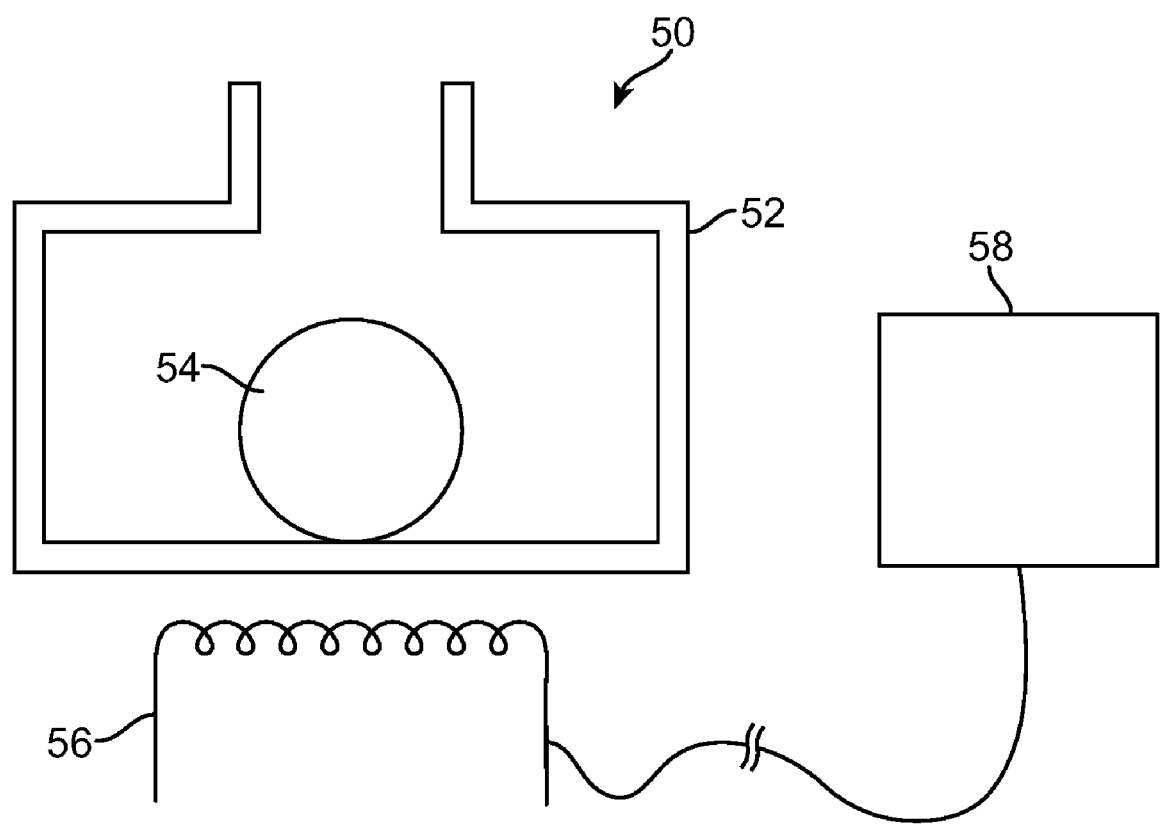
FIG. 4 illustrates a diagram of a microcolumnar scintillator fabrication system according to an embodiment of the present invention.

A scintillator fabrication system 50 of the present invention, as schematically illustrated in FIG. 4, will typically one or more source vessels or boats, with a boat 52 for each source material 54 for deposition, and one or more heating units or heat sources 56 for applying heat to source material present in a source boat 52 and material 54. Multiple source boats may be addressed by a single heat source or independently addressed by separate heat sources, but either way the system will be configured so as to allow application of independent temperature regimes or gradients to separate source materials where multiple sources/boats are present. The fabrication system can further include a control unit 58 that allows control of one or more aspects (e.g., selection of applied temperature) of the system and the fabrication process in general. Heating of multiple sources can be under the control of a single controller or control unit or can include several controllers, e.g., each source material addressed by a separate heating unit and controller. The system 50 and/or control unit 58 can be at least partially under manual control, e.g., by a technician or operator, and/or the system or aspects thereof can be more automated. For example, a control unit 58 can include one or more computers or electronics, as well as programming or instructions (e.g., stored on a storage media or memory device) that controls or assists in controlling aspects of the system and fabrication process. A system 50 can include, for example, programming for application of a selected temperature profile or gradient to a given source material.

The temperature profile selected and applied to one or more different source materials can be controlled in several ways. In one embodiment, an applied temperature gradient can be controlled by an open loop type mechanism. Sublimation rate versus time can be calculated and/or experimentally derived or verified for a selected source material, including material composition as well as geometric characteristics of a source material sample or bolus (e.g., volume, shape, etc.). Sublimation rate, time and temperature parameters can be programmed in a controller of the system so that a selected temperature profile and gradient is applied to a source material.

In another embodiment, an applied temperature gradient can be controlled by a closed loop type mechanism or feedback mechanism. For example, sublimation rate can be monitored on a real time basis and the temperature is adjusted accordingly. In one example, monitoring can be by deposition on a piezoelectric crystal, which changes its vibration frequency as it thickens, and signal output to control an applied temperature and sublimation and deposition rate. Other monitoring and/or feedback methods are available and may include, for example, methods such as laser interferometry, e.g., including monitoring of the position of a seed hanging from or supported by a fine spring.

The fabrication system of the invention can further include one or more chambers in which sublimation and deposition occurs, and in addition to controlling temperature as described above the system can include means for controlling atmospheric pressure during one or more steps of the scintillator fabrication process. In one embodiment, for example, scintillator fabrication includes deposition and formation of a microcolumnar ZnSe:Te. Fabrication of a ZnSe:Te scintillator can include a deposition pressure that is typically about $10^{-5}$ Torr but may range from $10^{-4}$ to $10^{-6}$ Torr. During deposition the temperature of the boats is in the range of 850 to 1050 C and the substrate is maintained in the 170 to 250 C range.

Various scintillator film deposition rates, as well as scintillator compositions and structure properties can be selected and controlled based on selected parameters for the fabrication process, such as atmospheric pressure, applied temperature, substrate temperature, and the like. In one embodiment, typical film growth rates for good columnar film are in the range 1 μm/minute. Various scintillator thicknesses can be selected and precisely controlled. For example, in certain embodiments, thickness non-uniformity of <0.1% over large areas has been achieved.

Figure 5:
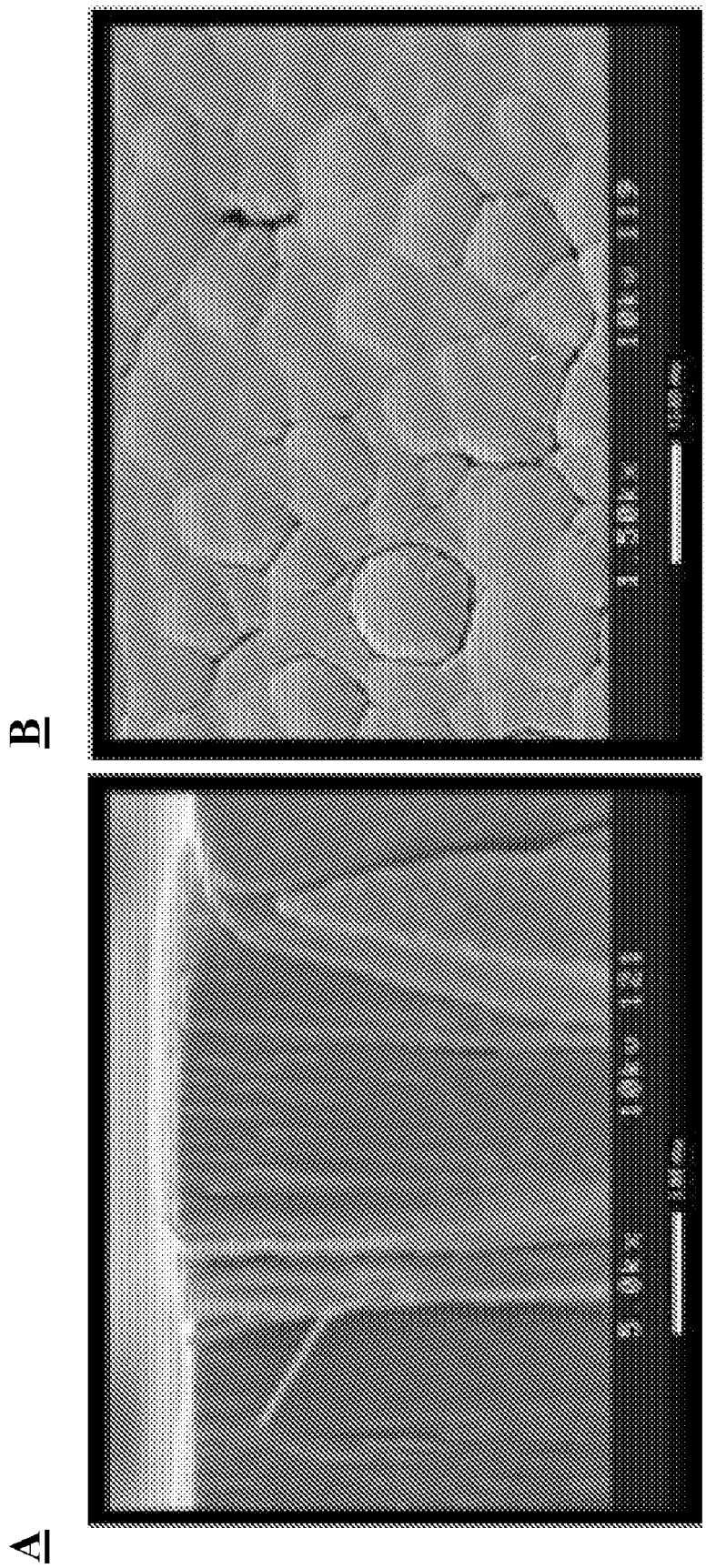
FIGS. 5A and 5B shows a SEM micrograph of a ZnSe(Te) microcolumnar scintillator according to an embodiment of the present invention.

In some embodiments, post-deposition treatment or processing of the deposited scintillator material may be desirable or necessary to enhance scintillation characteristics of the deposited scintillator film. For example, some films exhibit low light output immediately following the deposition process, with light output being increased following an annealing step. In certain examples, post deposition annealing applied to deposited ZnSe:Te scintillator films was effective in substantially enhancing scintillator brightness/light output characteristics and production of characteristic red emission. This annealing process helps create luminescence centers $\{V^-_{Zn}+Te^0+Zn^+\}$ including an isovalent dopant (e.g., Te) and excess Zn, which are responsible for the presence of the intense red emission, e.g., of the ZnSe:Te specimens To activate the scintillation process the film can be annealed, for example, in a Zn vapor atmosphere. The annealing apparatus comprises an evacuated and sealed chamber, such as a quartz tube containing films to be annealed and a source of Zn needed to saturate the atmosphere within. The quartz tube can be placed inside a heating furnace and the furnace temperature raised at the predetermined rate to a suitable temperature. In one embodiment, annealing temperatures are in the range of about 800 to 1000 C, pressure is in the range of about 1-3 atmospheres, and annealing time is in the range of about 3 to 8 hours. Annealing parameters can depend at least partially on film thickness. Using the described fabrication techniques as set forth above, columns as fine as 200 nanometers in diameter have been grown (FIG. 5). Column diameter will typically range from about 0.2 μm to about 20 μm.

Where a high annealing temperature is selected, substrates such as carbon (e.g., graphite) substrates and ceramic (e.g., $Al_2O_3$) substrates can be used. Due to these high temperatures, adhesion promotion is needed in some cases, and can be achieved, for example, by roughing the surface of the substrate, e.g., through etching, grinding or mechanical scoring. The substrate may also include a reflective material coating that can withstand high processing temperatures at or in excess of annealing temperatures (e.g., 1000 C). In case of ceramics such as Al2O3, the substrate itself is highly reflective and no additional reflective layer is needed.

In one embodiment, an approximately 250 μm thick graphite substrate was used, which is inexpensive and only minimally attenuate incident X-rays. The black surface of graphite minimizes optical scatter at the scintillator (e.g., ZnSe:Te)—graphite interface, thereby improving the spatial resolution of the film. Conversely, to produce films with higher light yield, a thin layer of highly reflective, high temperature material can be deposited (e.g., vapor-deposited) on the substrate surface prior to coating with scintillator material. Reflective material can include, for example, gold or platinum, which are suitable choices since high temperature annealing does not affect these layers and they do not interact with substrate or scintillator materials at higher temperatures. While this procedure lowers the spatial resolution somewhat, it enhances the light yield, e.g., by up to 25%.

Scintillators of the present invention can further include additional layers or coatings, such as reflective and/or protective layers or protective films, or combinations thereof. The protective material can include, for example, a para-xylylene polymer coating, such as compositions known by the trade name "parylene" including, for example, poly-para-xylylene (tradename "PARALENE N", such as available from Paratronix Inc., Attleboro, Mass.), polyvinylidene chlorides (e.g., saran resins or films), epoxy polymers, and the like. In one embodiment, one or more surfaces of the scintillator, such as a surface not facing the photodetector upon detector assembly may have an opaque coating to eliminate ambient lighting reaching the scintillator, or it may protect the material in handling. Optionally, even the surface facing the scintillator may have a protective transparent layer (e.g., parylene), although such a layer may degrade spatial resolution.

As set forth above, deposited scintillator material or films of the present invention can include films of various thicknesses. Typically microcolumnar scintillator films will be at least about 30 μm to about 650 μm thick, but can range from about 5 μm to about 1000 μm in thickness.

Furthermore, as set forth above, certain characteristics of the microcolumnar scintillators of the present invention, such as improved light channeling and increased resolution allows for use of thicker scintillators, providing additional advantages of increased absorption efficiency with thicker scintillator with minimized loss of resolution. Thus, the microcolumnar structure of scintillators of the present invention allows for reduction of the traditional tradeoff between spatial resolution and absorption efficiency. As such, microcolumnar scintillators of the present invention will include high spatial resolution scintillators, and can be used for assembly of high resolution devices, e.g., high resolution imaging devices. For example, microcolumnar scintillators of the present invention, and devices/assemblies thereof, will typically have a high spatial resolution, or will be configured to produce images having a high spatial resolution. High spatial resolution will typically include an image with a spatial resolution better than about 150 μm (e.g., 100 μm or better), and more typically better than about 50 μm, and in some instances better than about 10 μm.

Figure 6:
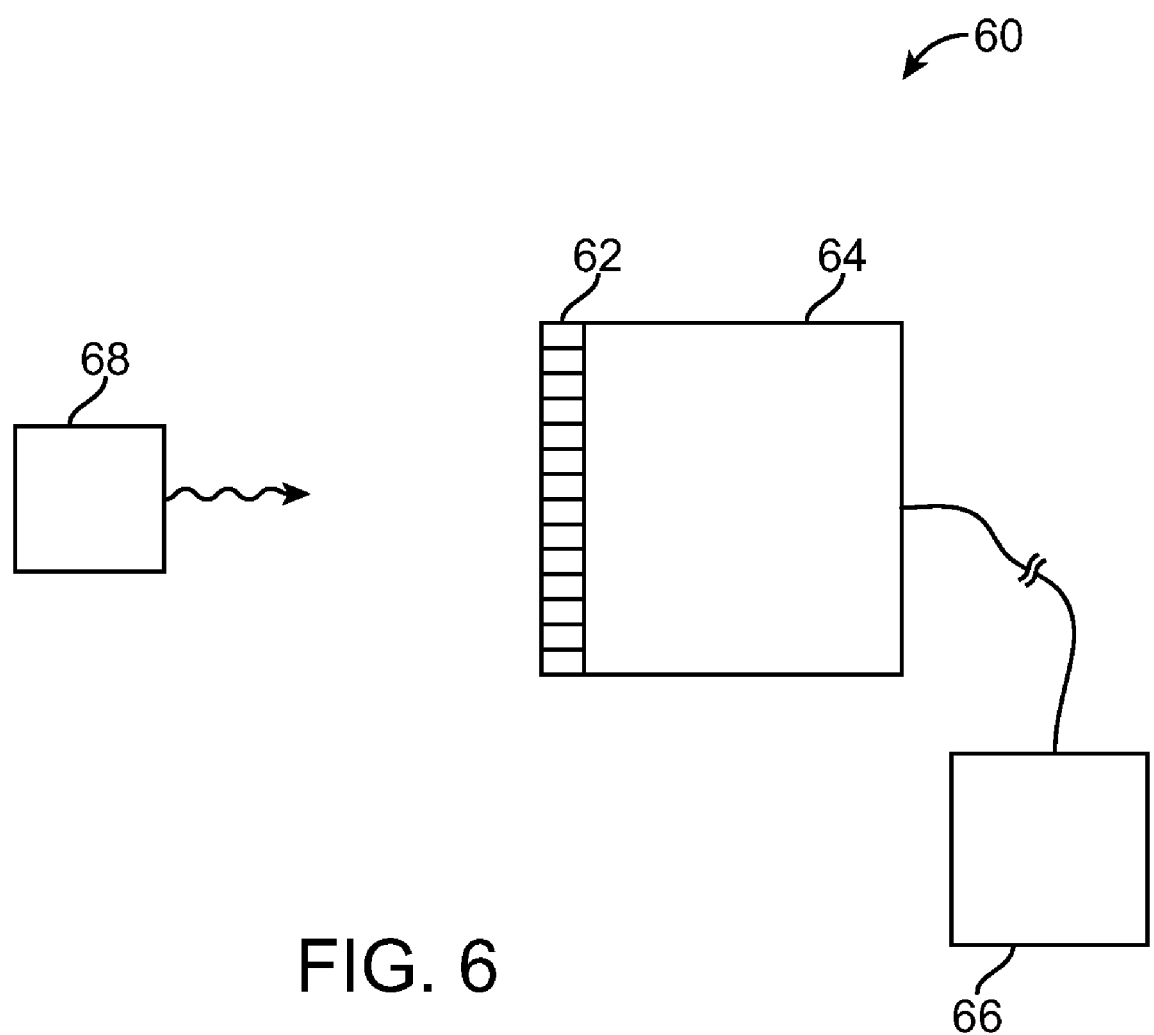
FIG. 6 illustrates a conceptual diagram of a detector assembly of the present invention.

As set forth above, the microcolumnar scintillator compositions of the present invention may find use in a wide variety of applications. In one embodiment, for example, the invention is directed to a method for detecting energetic radiation (e.g., gamma-rays, X-rays, and the like) with a scintillation detector including the microcolumnar scintillation composition of the invention. FIG. 6 is a diagram of a detector assembly of the present invention. The detector 60 includes a microcolumnar scintillator 62 optically coupled to a light photodetector 64 or imaging device. The detector assembly 60 can include a data analysis system 66 to process information from the scintillator 62 and light photodetector 64. In use, the detector 60 detects energetic radiation emitted form a source 68.

A detector or data analysis system thereof can include, for example, a module or system to process information (e.g., radiation detection information) from the detector/photodetectors included in an invention assembly and can include, for example, a wide variety of proprietary or commercially available computers, components or electronics having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to output or transmit data, signals, or information between components of the system in any of a wide variety of distributed or centralized signal processing architectures.

The detector assembly typically includes material formed from the scintillator composition described herein (e.g., microcolumnar ZnSe scintillators). The detector further can include, for example, a photon detection assembly including one or more photodetectors. Non-limiting examples of photodetectors include photomultiplier tubes (PMT), photodiodes, CCD sensors (e.g., EMCCD), image intensifiers, and the like. Choice of a particular photodetector will depend in part on the type of radiation detector being fabricated, and on its intended use of the device.

The detector assemblies themselves, which can include the microcolumnar scintillator and the photodetector assembly, can be connected to a variety of tools and devices, as mentioned previously. Non-limiting examples include nuclear weapons monitoring and detection devices, and imaging devices, such as imaging devices (e.g., CT scanner, PET scanners, etc.). Technologies for operably coupling or integrating a radiation detector assembly containing a scintillator to a detection device are known, and need not be described in detail here. For non-limiting examples of techniques for operably coupling detectors containing a scintillator to a detection device see, e.g., U.S. Pat. No. 6,989,541 (titled "Coincident neutron detector for providing energy and directional information") and commonly owned U.S. Pat. No. 7,173,247, the latter of which is herein incorporated by reference in its entirety.

The detectors may also be connected to a visualization interface, imaging equipment, or digital imaging equipment. In some embodiments, the scintillator may serve as a component of a screen scintillator. Energetic radiation, e.g., X-rays, electrons, originating from a source, would interact with the scintillator and be converted into light photons, which are detected and/or visualized or output as image data.

The present invention provides microcolumnar scintillator materials which can provide the desired high light output and initial photon intensity characteristics for demanding applications of the technologies, e.g., imaging technologies, as well as a combination of high detection efficiency and high spatial resolution. Light output of the microcolumnar scintillators of the present invention will typically be greater than about 60,000 photons/MeV, and more typically greater than about 80,000 photons/MeV. In some cases, light output can be greater than about 100,000 photons/MeV. Moreover, the invention scintillator compositions are also expected to simultaneously exhibit the other important properties noted above, e.g., fast rise time, short decay time, good stopping power, and timing resolution. Furthermore, the scintillator materials are also expected to be produced efficiently and economically, and also expected to be employed in a variety of other devices which require radiation/signal detection (e.g., gamma-ray, X-ray, and the like).

The following examples are provided to illustrate but not limit the invention.

EXAMPLES

The present examples provides characterization of microcolumnar, doped ZnSe scintillators according to an embodiment of the present invention. The examples provided herein are offered by way of illustration, not by way of limitation.

In one embodiment, films of ZnSe:Te in the range of 25 µm to 85 µm thickness were produced and tested for performance characteristics, the results of which are further described herein below. For detection of low energy X-rays, these films offered >80% X-ray absorption; up to a factor of three greater light emission (90,000 to 180,000 ph/MeV) compared to the highest known conversion efficiency scintillators; fast decay time in the microsecond range; virtually no afterglow, and an excellent radiation resistance. Furthermore, the 550 nm to 900 nm light emission, peaking at about 650 nm to 750 nm depending on the dopant concentration, of ZnSe:Te provides an excellent match to the quantum efficiency of the EMCCD sensor that are preferred as photodetectors. The microcolumnar structure overcomes the traditional tradeoff between spatial resolution and X-ray absorption efficiency which is important in applications such as time resolved diffraction application.

FIGS. 5A (side view) and 5B (top view) show the SEM micrographs of a 35 µm thick film. As can be seen from these SEMs, excellent columnar structure with ZnSe:Te has been achieved, managing the complexity involved in co-sublimation from two different sources, each with a markedly different vapor pressure. As measured from the broken fiber clearly seen in the SEM, column diameters are in the range of 200 nm, which should provide superior spatial resolution properties.

Spectral Characterization

The X-ray excited emission spectra of the microcolumnar ZnSe:Te films were measured using the 8 keV Cu $K_\alpha$ line. To generate the required flux at the sample, the X-ray generator was operated at 40 kV with 20 mA current. The resulting scintillation light was collected in a McPherson model 234/302-0.2 m monochromator. The intensity of the selected wavelength was registered using an RCA model C31034 photomultiplier tube (PMT). The operation of the whole instrument, including the X-ray trigger, the rotation of the monochromator to select the wavelengths, and the data acquisition and analysis, was software controlled.

Figure 7:
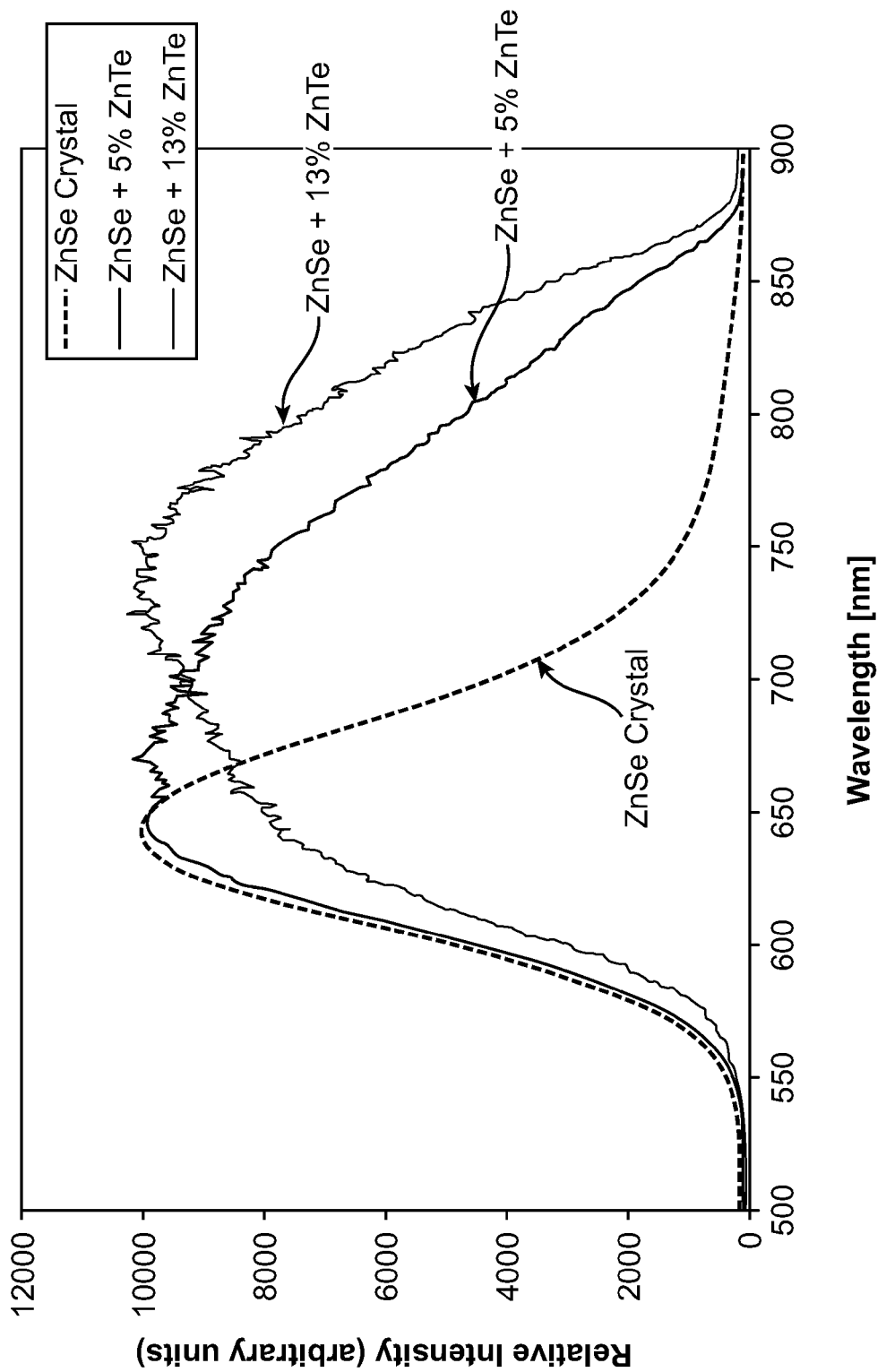
FIG. 7 shows the light emission spectrum, under continuous X-ray excitation, for ZnSe:Te films containing various amounts of Te, as well as the corresponding spectrum for crystalline ZnSe.
Figure 8:
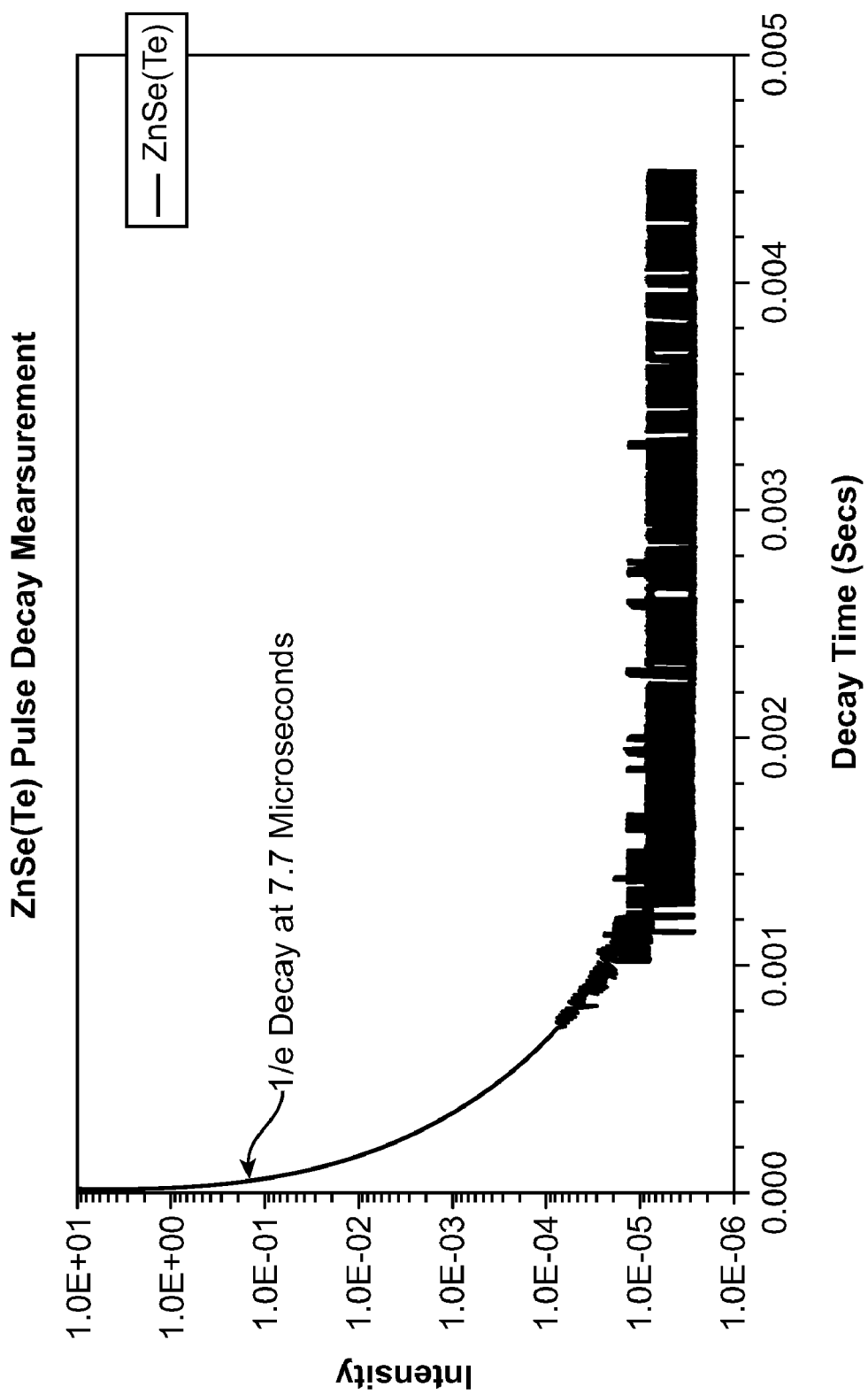
FIG. 8 shows ZnSe pulse decay measurements.

As illustrated in FIG. 7, these spectra somewhat resemble in shape those seen in the single crystal specimens, with an intense primary peak at about 625 nm. In the case of the films, however, further broadening of the emission band with a clear shift toward higher wavelengths is evident. As seen from the spectra, this shift is related to the concentration of dopant ZnTe in the ZnSe:Te film. The spectral shape in the case of crystal may be explained largely in terms of fractional crystallization, since growth of a crystal from the melt under equilibrium conditions tends to reject impurities from the lattice, whether or not they are wanted. Also, the crystalline nature eliminates secondary traps, which may otherwise contribute to the broader emission. Physical deposition from the vapor, however, is largely a function of the partial pressures of the constituents, opening the possibility of chemical compositions that are not achievable directly from the melt, thereby providing additional control for tuning the film properties. It is important to note that although shifted slightly to the higher wavelengths, the film emissions are within the range where the detector embodiment having an EMCCD photodetector has high quantum efficiency of 65% or higher.

Decay Time and Afterglow Measurements

For decay time characterization, specimens were excited by means of a Golden Engineering XRS-3 source, which provides 20 ns FWHM X-ray pulses with a nominal maximum photon energy of 250 kVp. The scintillation response from the specimens was passed through a 0.2 m McPherson monochromator, detected by a Hamamatsu R2059 photomultiplier, and recorded by a Tektronix TDS220 digital storage oscilloscope. This system permits measurements of both intensity and time over 9 orders of magnitude, which is adequate for characterizing the ZnSe:Te specimens.

Figure 9:
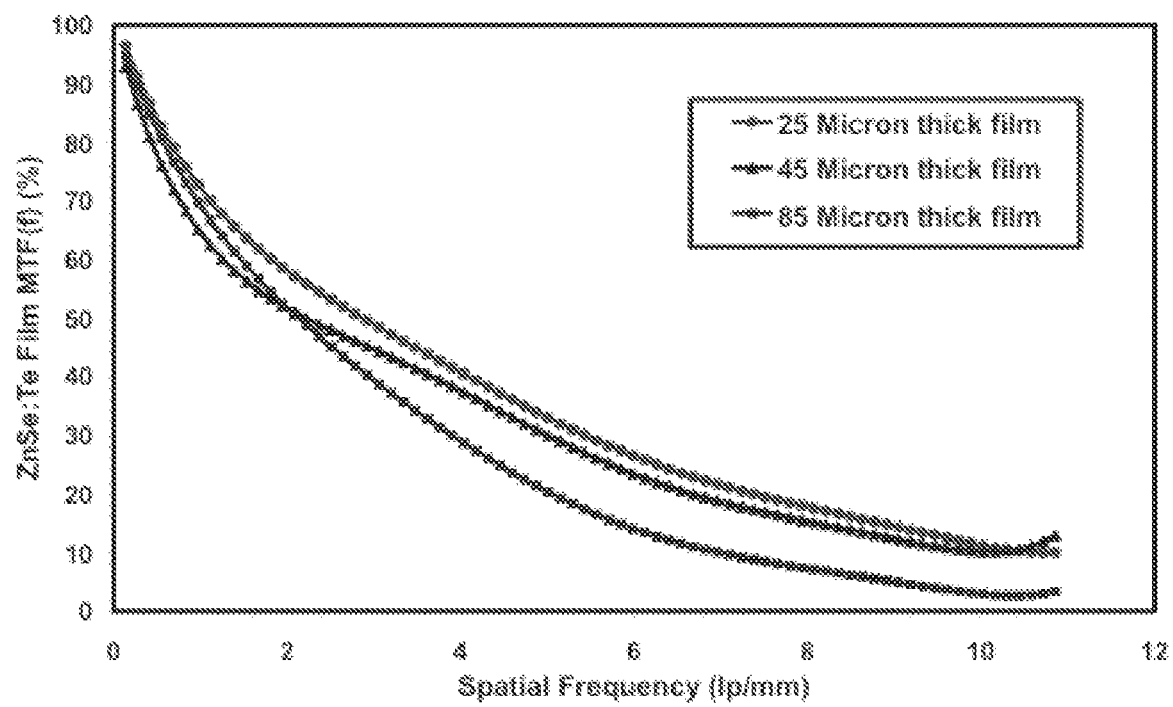
FIG. 9 shows spatial resolution measurements for 25 μm thick (circle plot), 45 μm thick (triangle plot), and 85 μm thick (square plot) microcolumnar scintillator films.

As shown in FIG. 9, the 1/e decay time of the films was 7.7 µs, somewhat higher than that of the reported 3.1 µs for the crystalline ZnSe:Te. This may be due to the introduction of additional traps developed when a polycrystalline film is fabricated. However, the films showed a 5 orders of magnitude drop in intensity within 1 ms, which is quite remarkable. This implies that the polycrystalline films of ZnSe are well suited for imaging at frame rates exceeding 1000 fps, and thus can satisfy the temporal resolution requirements of the discussed time resolved studies.

Persistence-Free Imaging Using ZnSe:Te

To demonstrate how ZnSe:Te scintillator's rapid light decay without afterglow helps high frame rate imaging, an 85 µm thick ZnSe film was integrated into the EMCCD, and X-ray images of an object were acquired. For comparison a commercially available CsI:Tl screen was also evaluated, whose thickness was ~200 µm. The X-ray source used was a 300 kVp pulsed source with a pulse duration of 50 ns. The camera was operated at 30 fps and the object was exposed to X-rays only during the first integration period, with the subsequent frames acquiring only the residual image provided by the afterglow. The resulting data for a conventional CsI:Tl screen and the ZnSe:Te film were collected (Data not shown).

The results showed that conventional CsI:Tl a residual image is visible even after 13 frames (which is normally beyond the limited sensitivity of commercial CCD systems, although the internal gain and very low noise of the EMCCD makes it sensitive enough to see the afterglow), whereas the ZnSe:Te film showed virtually no residual image in any of the subsequent frames. These data showed the utility of our material for dynamic X-ray imaging, and clearly demonstrate the feasibility of our approach for time-resolved diffraction applications.

X-Ray Characterization of the ZnSe:Te Films

X-ray characterization of the ZnSe:Te films was performed using the back-thinned, thermoelectrically cooled (−35° C.), 512×512 pixel electron-multiplying CCD (EMCCD), optically bonded to a 1:1 fiberoptic window. With its pixel size of 16 µm, the camera has a Nyquist limiting frequency of 31 lp/mm and its effective imaging area is ~8.2×8.2 mm2. Specially designed 3:1 and 6:1 fiberoptic tapers can be attached to the CCD window to achieve an effective imaging area of 24.6×24.6 mm2 and 49×49 mm2, respectively. The CCD device, readout electronics, including e.g., a 12 bit ADC, and image processing software selected operate on a PC platform.

The X-ray source for these measurements was a GE Senographe 600T-FD continuously adjustable X-ray generator with a Mo target. For the measurements reported here, the X-ray generator was set at 28 kVp and the distance from source to detector was maintained at 45 cm. During each measurement the exposure was monitored using a Nuclear Associates Model 06-526-5280 Rad Check Exposure meter and the data were corrected for any variations in exposure.

Scintillator Screens

Several experiments were conducted to test the scintillators as well as the EMCCD detector. While most data were acquired with ZnSe:Te films, additional scintillators were employed for imaging studies. These include microcolumnar CsI:Tl screens commercially available from Hamamatsu, Inc., ZnSe:Te powdered screens obtained from Bruker AXS (Wisconsin), and $Gd_2O_2S$:Tb screens from Kodak.

Light Output Measurements

Preliminary analysis of light output measurements were made by exposing the films to a uniform flood field of 28 kVp X-rays, and averaging analog-to-digital unit value (ADUs) in a pre-defined region of interest (ROI). For each measurement the X-ray exposure was 4 mR. Several measurements per screen were made to improve the statistical precision of the ADU value. These data were corrected for any variations in the measured X-ray exposure. The signal-to-noise ratio (SNR) in each screen was computed by dividing the average ADU value by the measured standard deviation in the flood image. These data are presented in Table 1.

TABLE 1

Measured light output of ZnSe:Te film.

| Film Descriptio | Form | Thickness (mg/cm$^2$) | Relative Light | SNR |
|---|---|---|---|---|
| $Gd_2O_2S$:Tb | Powdered | 27 | 2414 | 48 |
| CsI:Tl | Microcolumn | 36 | 3863 | 63 |
| ZnSe:Te | Powdered | 45 | 6760 | 83 |
| ZnSe:Te | Powdered | 27 | 4056 | 64 |
| ZnSe:Te | Microcolumn | 23 | 2221 | 56 |

Results show that the ZnSe:Te scintillators are the brightest, approximately 40% higher light than that of well-known CsI:Tl. Knowing the emission efficiency of CsI:Tl to be about 62,000 photons/MeV, estimated efficiency of ZnSe:Te is ~87,000 photons/MeV. While not a highly precise measurement, these preliminary data demonstrate the utility of the ZnSe:Te material for achieving the bright emissions suitable for numerous scintillation applications and as needed for high speed imaging studies. Further data generated and/or refinements are expected to show improvements and further optimization of light output measurements, including microcolumnar ZnSe:Te scintillators having light output properties exceeding that of the powdered form.

Spatial Resolution Measurements

To evaluate the spatial resolution, the pre-sampling MTF was measured according to the technique described, for example, by Fujita et al. (Ref). An image of a 10 µm wide tantalum slit placed at a slight angle (less than one degree) to the CCD pixel matrix at the center of the detector was obtained. The slit was placed in contact with the surface of the imager so that the spreading of the Line Spread Function (LSF) due to the finite size of the focal spot would not pose a significant limitation. The exposure was adjusted by varying the current (mA) while maintaining a constant 28 kVp, to ensure that the tails of the resulting step function had no significant electronic noise. The finely sampled LSF was obtained and normalized to a peak value of unity. The Fourier Transform (FT) of the finely sampled LSF was performed to provide the pre-sampling MTF. FIG. 9 shows the measured MTF as a function of spatial frequency for ZnSe:Te films ranging from 25 μm to 85 μm in thickness.

As can be seen from these data, all the films showed excellent spatial resolution of about 10 lp/mm, corresponding to a resolution of about 50 μm. Also, as expected, thinner films showed higher resolution. Note that due to the high density and high average atomic number of the ZnSe:Te, films as thin as only ~40 μm thick can absorb over 90% of the 12 keV X-rays used in SAXS studies.

DQE Measurements

The detective quantum efficiency (DQE(f)) of an imaging system represents its dose efficiency and has been shown to be highly predictive of the performance characteristics of the system (Ref). We have measured the DQE(f) of the EMCCD detector using microcolumnar ZnSe:Te films. The DQE(f) was calculated from the measured resolution (pre-sampling MTF(f)), the noise power spectrum ($NPS_{normalized}(f,\phi_x)$), and the photon fluence/exposure ($\phi_x$) of the incident X-ray spectrum, as is described by Fujita et al. (Ref) and others (Ref). All measurements were performed at 28 kVp, 30 mAs settings, using the Mo/Mo X-ray source described earlier. By substituting these values, the DQE(f) of the system was calculated as:

$$DQE(f) = \frac{MTF^2(f)}{\phi_x \cdot NPS_{normalized}(f, \phi_x)}$$

Figure 10:
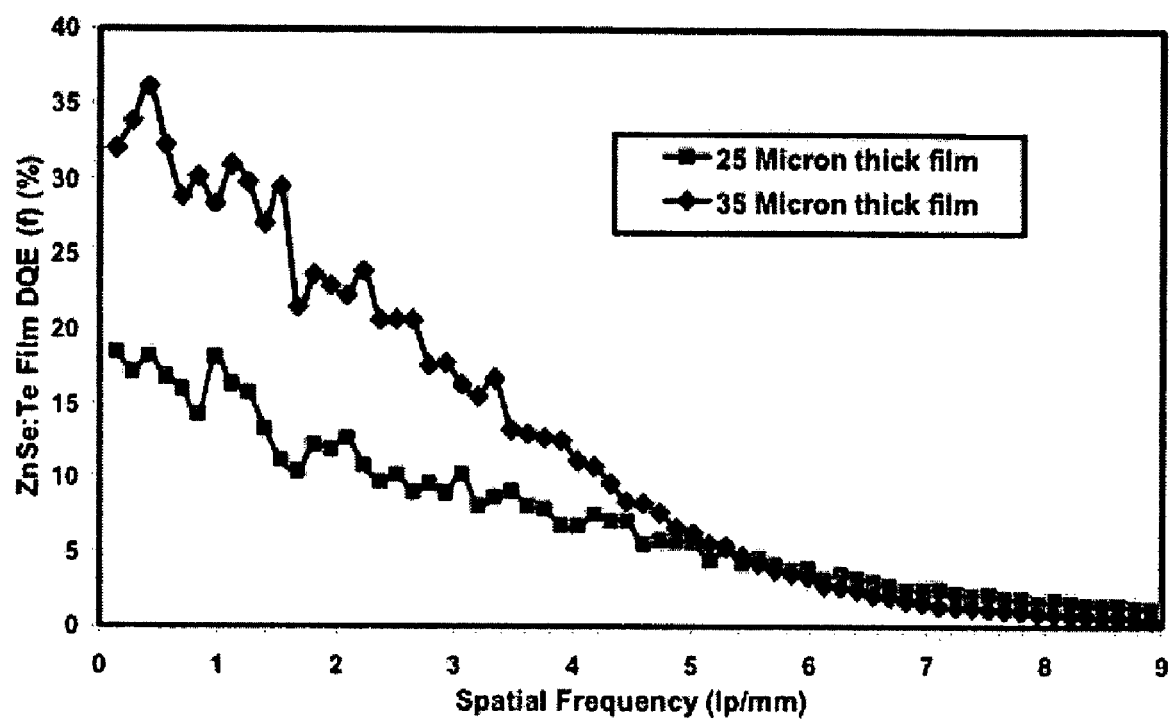
FIG. 10 illustrates measured DQE(f) of a detector using ZnSe:Te microcolumnar screens measured at 28 kVp, 160 mAs.

The resulting data are plotted in FIG. 10. The thicker screen showed higher DQE(0) than the thinner screen for the 28 kVp incident beam. This relatively low DQE(0) is primarily due to the lower thickness of the screens, which are tailored for 8-12 keV operation. However, note that the DQE(f) for both screens is above 5 lp/mm with its tails extending to over 9 lp/mm. This is an excellent performance and is attributed to the excellent spatial resolution of the screens. With enhanced light yield, we expect the DQE to be significantly higher.

Radiographic Imaging

To illustrate its X-ray imaging capability, a 35 μm thick ZnSe(Te) screen was coupled to the EMCCD via a 3:1 fiberoptic taper. The X-ray source-to-detector distance was 60 cm, and the imaging object was placed in close contact with the ZnSe:Te film. Imaging results showed an image of an integrated circuit (IC) chip obtained at 30 fps speed (Not shown). Images obtained showed 25 μm thick bond wires clearly resolved, illustrating high spatial resolution, the excellent dynamic range, and the high contrast sensitivity of the ZnSe:Te film. Imaging results further showed the image of a printed circuit board on which the chip was mounted.

Point Spread Function (PSF) Measurements

For crystallography applications, detectors with a point spread function (PSF) of 100 μm or less are needed to resolve closely spaced Bragg peaks in the diffraction pattern. To quantify the detector PSF, a specially developed 250 μm thick tantalum mask was used. This mask consists of a 9×9 array of high precision pinholes, each measuring 175 μm in diameter and spaced 5 mm apart from the next hole in either direction. A 35 μm ZnSe:Te screen was coupled to the EMCCD via the 3:1 taper, as before, and a radiographic image of the mask was obtained using 28 kVp X-rays. The image data were analyzed to calculate the full width at half maximum (FWHM), full width at $10^{th}$ maximum, etc. The resulting data are listed in Table 2.

TABLE 2

PSF measurements of 35 μm thick ZnSe films

| Full width at | PSF (μm) |
|---|---|
| 1/2 | 67 |
| 1/10 | 269 |
| 1/50 | 451 |
| 1/100 | 615 |
| 1/500 | 3934 |

To measure the PSF with high accuracy, 8 line profiles through each of the hole images were traced and fitted to a Gaussian. The PSF data from each of these measurements were averaged. Since the mask holes were large, the PSF was deconvolved using the equation $PSF=(FWHM^2-Pinhole\ size^2)^{1/2}$. As can be seen from these data, the PSF at FWHM is closer to the 48 μm effective pixel size of the detector using the 3:1 fiberoptic, and shows the high resolution capability of the detector.

Although the invention has been described with reference to the above examples, it will be understood that modifications and variations are encompassed within the spirit and scope of the invention. Accordingly, the invention is limited only be the following claims along with their full scope of equivalents.

What is claimed is:

1. A scintillator comprising, a microcolumnar scintillator material comprising zinc selenide and a dopant.

2. The scintillator of claim 1, wherein the dopant comprises Te, O, or Cu.

3. The scintillator of claim 1, wherein the microcolumnar scintillator material comprises a thickness of about 25 μm to about 85 μm.

4. The scintillator of claim 1, wherein the microcolumnar scintillator material comprises microcolumns of about 200 nanometers to about 20 μm in diameter.

5. The scintillator of claim 1, wherein the scintillator is a high spatial resolution scintillator.

6. The scintillator of claim 5, the scintillator having an imaging spatial resolution better than about 100 μm.

7. The scintillator of claim 5, the scintillator having an imaging spatial resolution better than about 50 μm.

8. The scintillator of claim 1, the scintillator comprising a light output of greater than about 30,000 photons/MeV.

9. The scintillator of claim 1, wherein the microcolumnar scintillator material comprises a sublimation-deposited microcolumnar zinc selenide material doped with Te.

10. A method of fabricating a microcolumnar scintillator, comprising:
   co-sublimating a first material comprising ZnSe and a second material comprising a Zn-dopant salt so as to form a microcolumnar scintillator material layer deposited on a substrate; and
   annealing the microcolumnar scintillator in a zinc-containing atmosphere.

11. The method of claim 10, wherein the dopant is selected from Te, O, or Cu.

12. The method of claim 10, wherein the co-sublimating comprises applying independently controlled temperature gradients to each of the first material and the second material so as to maintain substantially constant rates of sublimation of the first and second materials.

13. The method of claim 12, wherein an applied temperature gradient comprises applied temperatures ranging from about 850 degrees C. to about 1050 degrees C. during deposition.

14. The method of claim 10, wherein the zinc-containing atmosphere comprises a pressure of about one to about three atmospheres.

15. A method of fabricating a microcolumnar scintillator, comprising:
providing a first boat comprising a first source material and a second boat comprising a second source material;
forming a microcolumnar scintillator deposited on a substrate, the forming comprising applying independently controlled temperature gradients to each of the first material and the second material so as to maintain substantially constant rates of material sublimation and deposition on the substrate; and
annealing the microcolumnar scintillator deposited on the substrate.

16. The method of claim 15, wherein the first source material comprises ZnSe and the second source material comprises a zinc-dopant salt.

17. The method of claim 16, wherein the dopant comprises Te, O, or Cu.

18. The method of claim 15, at least one of the first and second boats further comprising a collimator.

19. The method of claim 15, wherein the temperature gradient applied to a boat is selected to produce a sublimation rate while accounting during a decrease of surface area of a source material of the boat.

20. The method of claim 15, wherein an applied temperature gradient is controlled by an open-loop mechanism.

21. The method of claim 15, wherein an applied temperature gradient is controlled by a closed-loop mechanism.

22. The method of claim 16, the annealing comprising annealing in a zinc atmosphere.

23. A radiation detection device comprising a scintillator comprising a doped zinc selenide microcolumnar scintillator material formed on a substrate; and a photodetector assembly optically coupled to the scintillator.

24. The radiation detection device of claim 23, wherein the dopant comprises Te, O, or Cu.

25. The radiation detection device of claim 23, wherein the device is an imaging device.

26. The radiation detection device of claim 25, further comprising an X-ray source.

27. The radiation detection device of claim 26, wherein the device is an X-ray computed tomography (CT) imaging device.

28. The radiation detection device of claim 26, wherein the device is a time-resolved X-ray diffraction imaging device.

29. The radiation detection device of claim 25, further comprising electronics coupled to the photodetector assembly so as to output image data in response to radiation detected by the scintillator.

30. The radiation detection device of claim 23, wherein the photodetector assembly comprises a charge coupled device (CCD), an electron-multiplied CCD, a photomultiplier tube, a photodiode, a PIN detector, or an avalanche photodiode detector.

31. A method of performing radiation detection, comprising:
providing a detector device comprising a scintillator comprising a doped zinc selenide microcolumnar scintillator material formed on a substrate; and a photodetector assembly optically coupled to the scintillator; and
positioning a radiation source within a field of view of the scintillator so as to detect emissions from the radiation source.

32. The method of claim 31, wherein the emission comprise X-ray emissions.

33. A scintillator comprising, a microcolumnar scintillator material comprising zinc selenide and a dopant, the scintillator formed by a process comprising co-sublimating a first material comprising ZnSc and a second material comprising a Zn-dopant salt so as to form a microcolumnar scintillator material layer deposited on a substrate, and annealing the microcolumnar scintillator in a zinc-containing atmosphere.

* * * * *